J. GARTZWEILER.
TENSION PULLEY.
APPLICATION FILED JULY 15, 1908.

932,117.

Patented Aug. 24, 1909.

Witnesses:
H. D. Smith
E. M. Morgan

Inventor:
Johann Gartzweiler
By B. Singer  Attorney

UNITED STATES PATENT OFFICE.

JOHANN GARTZWEILER, OF LEIPZIG-GOHLIS, GERMANY.

TENSION-PULLEY.

932,117. Specification of Letters Patent. Patented Aug. 24, 1909.

Application filed July 15, 1908. Serial No. 443,724.

*To all whom it may concern:*

Be it known that I, JOHANN GARTZWEILER, a subject of the German Emperor, and resident of Leipzig-Gohlis, Germany, have invented certain new and useful Improvements in Tension-Pulleys, of which the following is a specification.

This invention has reference to a belt, rope or chain drive and more especially to a drive of this kind provided with a tension pulley, the object of the invention being to provide a drive of this kind wherein means are provided for controlling the pressure exerted by the said tension pulley or idler on the flexible driving member. As a matter of fact, experience has shown that when the speed of the drive increases, the friction between the belt, rope or chain and the pulley or wheel is considerably increased too and that consequently the circumferential force which can be transmitted is also increased. On the other hand in nearly all the industrial engines to be driven the circumferential force necessary for the starting operation, is by reason of the acceleration forces and the increased bearing frictions to be overcome, considerably greater than the circumferential force necessary for the working itself. It follows therefrom that the belts used in the usual belt drives must be tensioned with a much greater force than would be necessary for the working proper, whereby the efficiency of the belt drive is considerably reduced.

The device shown in the annexed drawing has for its object to reduce the tension of the tractional member down to the necessary amount.

Figure 1:
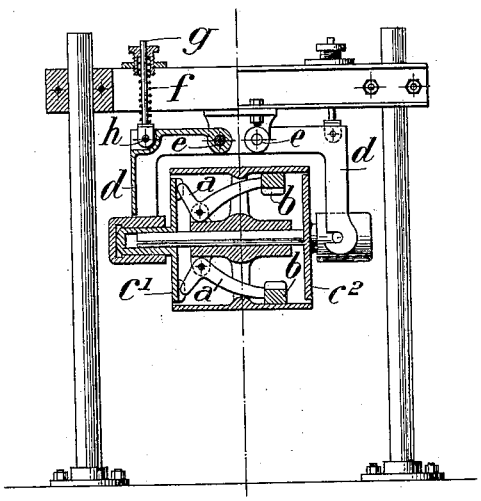
Figure 2:
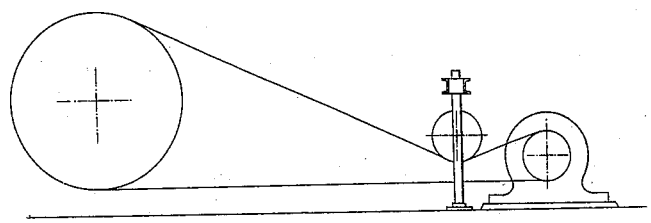

In this drawing:—Figure 1 is a view, partly in elevation, partly in section, of a tension pulley provided with the tension controlling device constructed according to the principles of the present invention, while Fig. 2 is a diagrammatical view of the belt drive.

The device is constructed and works in the following manner.

The crank levers $a$ (Fig. 1) carry at one of their ends the masses $b$ adapted to participate in the rotation and which during the rotation of the pulley are thrown outward by the centrifugal force. The other branch of the crank levers $a$ pushes thereby the disk $c^1$ outward in the direction of the axis of the pulley shaft. The disk $c^2$ arranged at the opposite end of the said pulley is moved in a similar manner by a pair of inversely arranged crank levers which are angularly disposed with reference to the first named pair of crank levers $a$. The separation of the disks $c^1$ and $c^2$ also causes the ends of the crank levers $d$ to be separated from each other. As the crank levers are rotatably supported at $e$, the free branches thereof are moved upward during the said separation whereby the raising of the roller and consequently the reduction of the tension of the tractional member are obtained.

The crank levers $d$ are pressed down in a yielding manner by means of coiled springs $f$ arranged on rods $g$ which are hingedly connected at $h$ with the said crank levers $d$.

Having now fully described my said invention, what I claim and desire to secure by Letters Patent, is:

1. In a flexible drive the combination with the flexible driving member, of a tension pulley, suspending means therefor, a plurality of crank levers hingedly connected with the hub of said tension pulley and provided with weighted ends adapted to be thrown outwardly by the action of the centrifugal force, the other ends of the said crank levers being adapted to act upon the suspending means of the said pulley so as to move the latter away from the flexible driving member when the speed thereof is increased, substantially as and for the purpose set forth.

2. In a flexible drive the combination with a flexible driving member, a framework, a tension pulley, a shaft therefor, a bearing for each end of said shaft, a crank lever for each end of said shaft having one of its ends pivotally connected with the said framework above the said tension pulley and the other end pivotally connected with one of said bearings, a disk arranged in each end of said tension pulley and adapted to slide on the shaft of said pulley and to move the said bearing outwardly, a plurality of crank levers pivotally connected with the hub of said tension pulley and carrying at one end centrifugal weights, their other ends forcing said disks axially outwardly when the said centrifugal weights are thrown outwardly radially by the action of the centrifugal force, substantially as and for the purpose set forth.

3. In combination, a flexible transmission member, pulleys about which said member is trained, a hollow inclosed tension pulley idly engaging said member between said pulleys, supporting devices permitting movement of said pulley to vary the tensions on said transmission member, and actuating means located wholly within said pulley for varying the tensioning action thereof.

4. In combination, a flexible transmission member, pulleys about which said member is trained, a hollow inclosed tension pulley idly engaging said member between said pulleys, supporting devices permitting movement of said pulley to vary the tensions on said transmission member, and centrifugally acting means located wholly within said pulley for varying the tensioning action thereof.

5. In combination, a flexible transmission member, pulleys about which said member is trained, a hollow inclosed tension pulley idly engaging said member between said pulleys, yieldingly actuated supporting arms permitting movement of said pulley to vary the tension on said transmission member, and centrifugally acting means located wholly within said pulley and acting on said arms for varying the tensioning action of said pulley upon said member.

In testimony whereof I have hereunto set my hand in presence of two witnesses.

JOHANN GARTZWEILER.

Witnesses:
RUDOLPH FRICKE,
CARL STREGLER.